United States Patent
Aquilina et al.

(10) Patent No.: US 11,142,119 B1
(45) Date of Patent: Oct. 12, 2021

(54) VEHICLE LIGHTING ASSEMBLY AND INSTALLATION METHOD

(71) Applicant: Ford Global Technologies, LLC, Dearborn, MI (US)

(72) Inventors: Anthony Nicholas Aquilina, Royal Oak, MI (US); Nicholas Bernard Douglas, Southfield, MI (US); Michael Bryan VanBelle, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/835,730

(22) Filed: Mar. 31, 2020

(51) Int. Cl.
*B60Q 1/26* (2006.01)
*B60Q 1/30* (2006.01)

(52) U.S. Cl.
CPC ............. *B60Q 1/2623* (2013.01); *B60Q 1/30* (2013.01)

(58) Field of Classification Search
CPC .... B60Q 1/0441; B60Q 1/045; B60Q 1/2623; B60Q 1/30
See application file for complete search history.

(56) References Cited

U.S. PATENT DOCUMENTS

| | | | | |
|---|---|---|---|---|
| 4,356,539 A | * | 10/1982 | Shanks | B60Q 1/0433 362/273 |
| 4,994,942 A | * | 2/1991 | Georgeff | B60Q 1/2607 362/368 |
| 10,518,696 B2 | * | 12/2019 | Puente | F21V 19/00 |
| 2013/0335991 A1 | * | 12/2013 | Proepper | F21S 43/51 362/549 |
| 2019/0054960 A1 | | 2/2019 | Rompage et al. | |
| 2020/0217478 A1 | * | 7/2020 | Marchlewski | B60Q 1/2638 |

FOREIGN PATENT DOCUMENTS

| | | |
|---|---|---|
| CN | 209336588 | 9/2019 |
| EP | 2108569 | 10/2009 |
| JP | 5647928 | 11/2014 |

* cited by examiner

*Primary Examiner* — Leah Simone Macchiarolo
(74) *Attorney, Agent, or Firm* — David Coppiellie, Esq.; Carlson, Gaskey & Olds, P.C.

(57) ABSTRACT

A vehicle lighting assembly installation method includes, among other things, coupling an outer panel of a vehicle to a body structure of the vehicle, biasing a lighting assembly outward away from the body structure toward the outer panel, and securing the lighting assembly to the body structure during the biasing. A vehicle assembly includes, among other things, a body structure of a vehicle, an outer panel secured to the body structure, a lighting assembly secured to the body structure, and a biasing member that biases the lighting assembly outward away from the body structure toward the outer panel when securing the lighting assembly to the body structure.

18 Claims, 5 Drawing Sheets

VEHICLE LIGHTING ASSEMBLY AND INSTALLATION METHOD

TECHNICAL FIELD

This disclosure relates generally to installing a lighting assembly and, in particular, installing a lighting assembly on a vehicle having removable outer panels.

BACKGROUND

Vehicles include outer panels. On some vehicles, the outer panels are designed to be removed by a user. This enables the user to periodically remove and replace the outer panels for aesthetic reasons or due to damage, as examples. Vehicle lighting assemblies, such as rear taillight assemblies, are often at least partially secured to outer panels when in an installed position on a vehicle. Accordingly, removing the vehicle lighting assembly may be required in order to remove an outer panel.

SUMMARY

A vehicle lighting assembly installation method according to an exemplary aspect of the present disclosure includes, among other things, coupling an outer panel of a vehicle to a body structure of the vehicle, biasing a lighting assembly outward away from the body structure toward the outer panel, and securing the lighting assembly to the body structure during the biasing.

In another example of the foregoing vehicle lighting assembly installation method, the biasing is provided by a biasing device extending from a back side of the lighting assembly.

In another example of any of the foregoing vehicle lighting assembly installation methods, the securing includes securing both an outboard side of the lighting assembly and a portion of the outer panel to the body structure using an outboard mechanical fastener.

In another example of any of the foregoing vehicle lighting assembly installation methods, the outboard mechanical fastener is a shoulder bolt that extends through an aperture of the lighting assembly and an aperture of the outer panel when the outboard mechanical fastener is securing both the outboard side of the lighting assembly and the portion of the outer panel to the body structure.

In another example of any of the foregoing vehicle lighting assembly installation methods, the securing further includes securing an inboard side of the lighting assembly to the body structure using at least one inboard mechanical fastener.

In another example of any of the foregoing vehicle lighting assembly installation methods, after the securing, the outer panel can be decoupled from the body structure while the lighting assembly is secured to the body structure through the at least one inboard mechanical fastener.

In another example of any of the foregoing vehicle lighting assembly installation methods, during the biasing and before the securing, the method constrains forward and aft movement of the lighting assembly relative to the body structure more than inboard and outboard movement of the lighting assembly relative to the body structure.

In another example of any of the foregoing vehicle lighting assembly installation methods, during the biasing and before the securing, the method constrains forward and aft movement of the lighting assembly relative to the body structure more than upward and downward movement of the lighting assembly relative to the body structure.

Another example of any of the foregoing vehicle lighting assembly installation methods includes constraining movement of the lighting assembly relative to the body structure using a floating grommet disposed within an aperture provided by one of the lighting assembly or the body structure, the floating grommet coupled with an extension from the other of the lighting assembly or the body structure during the biasing.

In another example of any of the foregoing vehicle lighting assembly installation methods, the outer panel is a rear quarter panel and the lighting assembly is a rear taillight assembly.

In another example of any of the foregoing vehicle lighting assembly installation methods, the lighting assembly is nested within an opening of the outer panel such that the outer panel extends along an upper side of the lighting assembly and further extends along an outboard side of the lighting assembly.

Another example of any of the foregoing vehicle lighting assembly installation methods includes biasing using a spring clip.

A vehicle assembly according to another exemplary aspect of the present disclosure includes, among other things, a body structure of a vehicle, an outer panel secured to the body structure, a lighting assembly secured to the body structure, and a biasing member that biases the lighting assembly outward away from the body structure toward the outer panel when securing the lighting assembly to the body structure.

In another example of the foregoing assembly, the biasing member is a spring clip.

Another example of any of the foregoing assemblies includes an alignment assembly having an extension received within a floating grommet that is disposed within an aperture. The alignment assembly is configured to constrain forward and aft movement of the lighting assembly relative to the body structure more than inboard and outboard movement of the lighting assembly relative to the body structure when securing the lighting assembly to the body structure.

Another example of any of the foregoing assemblies includes an outboard mechanical fastener that extends through an aperture of the lighting assembly and an aperture of the outer panel to secure an outboard side of the lighting assembly and a portion of the outer panel to the body structure.

Another example of any of the foregoing assemblies includes at least one inboard mechanical fastener that secures an inboard region of the lighting assembly to the body structure.

In another example of any of the foregoing assemblies, the outer panel is configured to be removed from the body structure while the lighting assembly remains secured to the body structure with the at least one inboard mechanical fastener.

In another example of any of the foregoing assemblies, the lighting assembly is nested within an opening of the outer panel such that the outer panel extends along an upper side of the lighting assembly and further extends along an outboard side of the lighting assembly.

In another example of any of the foregoing assemblies, the outer panel is a rear quarter panel and the lighting assembly is a rear taillight assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to securing a lighting assembly to a vehicle, particularly a vehicle having removable outer panels.

During vehicle assembly, an outer panel of a vehicle can be secured to a body structure of a vehicle. The outer panel can be, for example, a rear quarter panel. After the outer panel is secured, a lighting assembly, such as a rear taillight assembly, is secured to the body structure of the vehicle. During the securing of the lighting assembly, the lighting assembly is biased outward toward the outer panel. This can facilitate positioning the lighting assembly relative to the outer panel to, among other things, help control gaps between the lighting assembly and the outer panel. Controlling the positioning of the lighting assembly relative to the outer panel can help to maintain desired spacing between the lighting assembly and the outer panel, which can facilitate achieving a desired appearance such as a particular fit and finish objective.

Once the lighting assembly is mounted to the body structure, the outer panel can be removed from the vehicle while the lighting assembly remains secured to the body structure. The outer panel can be removed when a user desires to swap the outer panel with another outer panel to provide their vehicle with a more rugged appearance, to equip the vehicle with an outer panel more suited to off-roading, or for some other reason.

Figure 1:
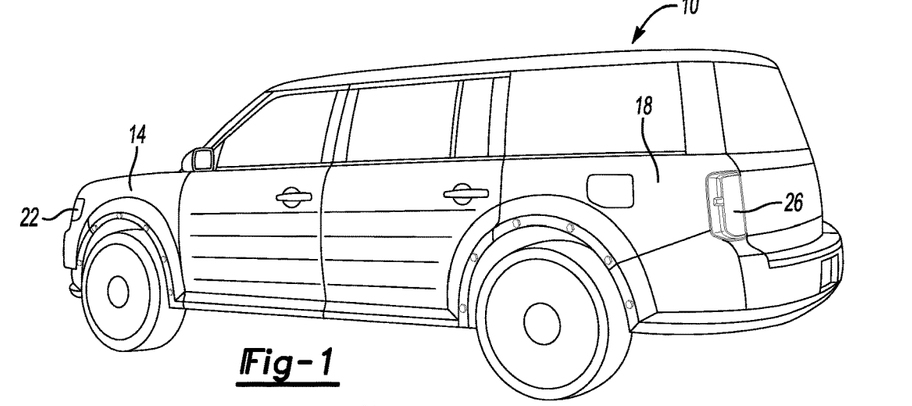
FIG. 1 illustrates a perspective view of an example vehicle having removable outer panels.

With reference to FIG. 1, an example vehicle 10 includes a plurality of outer panels 14, 18, and a plurality of lighting assemblies 22, 26. The outer panel 14 is a front fender, and the outer panel 18 is a rear quarter panel. The lighting assembly 22 is a front headlight, and the lighting assembly 26 is a rear taillight.

At least the outer panel 18 is removable by a user. The user may wish to remove the outer panel 18 and replace it with a different outer panel to change an appearance of the vehicle 10.

Figure 2:
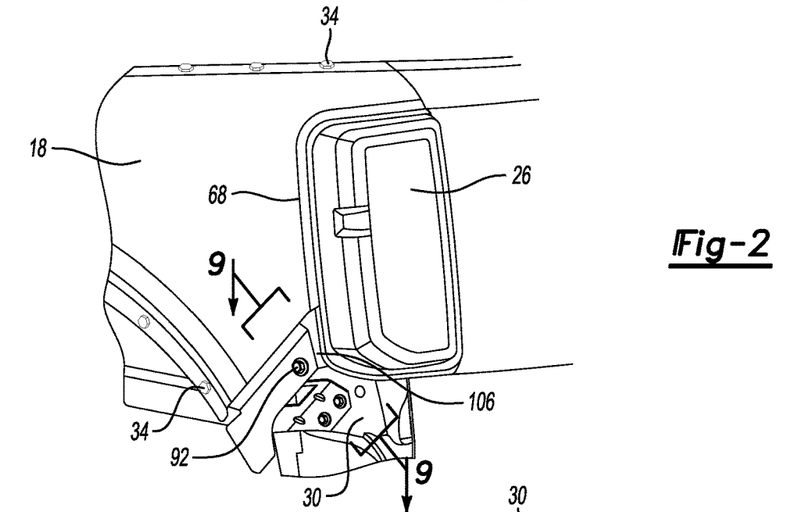
FIG. 2 illustrates a close-up view of selected portions of the vehicle of FIG. 1 showing one of the outer panels secured to a body structure of the vehicle.

With reference now to FIG. 2, the outer panel 18 can be secured to a body structure 30 of the vehicle 10 in an installed position using a plurality of mechanical fasteners 34, such as bolts. The mechanical fasteners 34 can extend through apertures in the outer panel 18 and threadably engage the body structure 30 of the vehicle 10. Generally, the body structure 30 is a rigid or fixed part of the vehicle 10. The body structure 30 can include many rigid parts of the vehicle 10, such as a body side, pillar structure, front floor, under floor, frame, engine compartment, etc. Here, the body structure 30 is an upper body structure.

Figure 3:
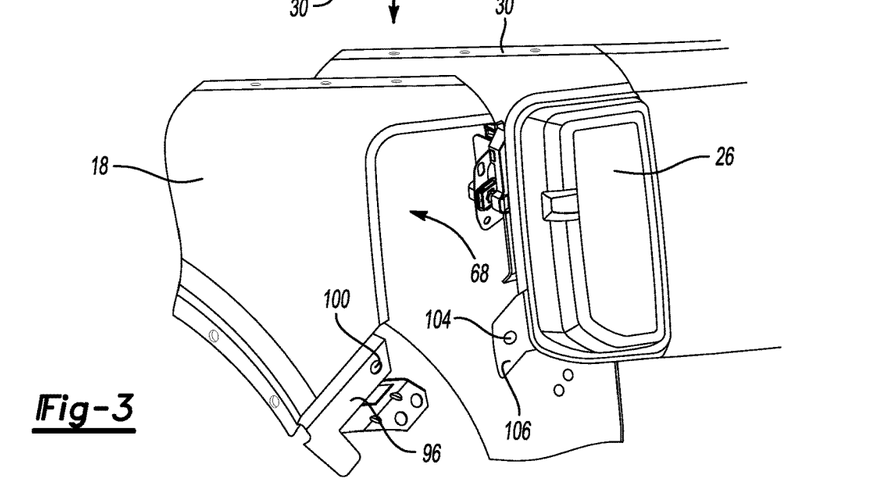
FIG. 3 illustrates the outer panel of FIG. 2 removed from the body structure.

In the exemplary embodiment, a user can remove the outer panel 18 from the body structure 30 by disengaging the mechanical fasteners 34. As shown in FIG. 3, once the mechanical fasteners 34 are disengaged, the outer panel 18 can be removed from the body structure 30

The lighting assembly 26 remains secured to a rigid part of the vehicle 10 as the outer panel 18 is removed. That is, demounting the lighting assembly 26 from the body structure 30 is not required to remove the outer panel 18 from the body structure 30. The lighting assembly 26 may be required to remain secured in this way unless repairing the lighting assembly 26 is necessary.

Figures 4, 5:
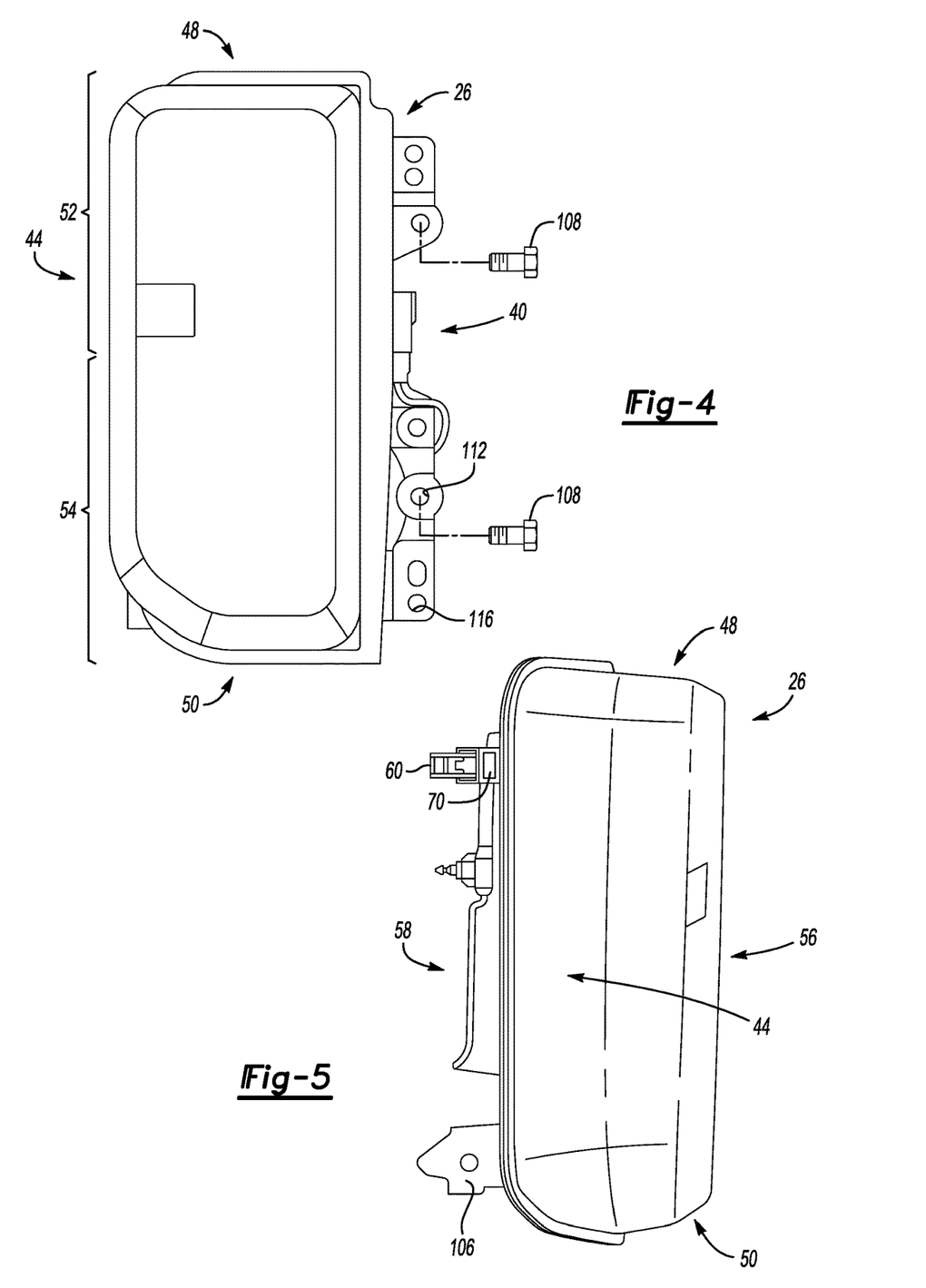
FIG. 4 illustrates a front view of a lighting assembly from the vehicle of FIG. 1.
FIG. 5 illustrates a side view of the lighting assembly of FIG. 4.

With reference now to FIGS. 4 and 5, and continuing reference to FIGS. 1-3, the lighting assembly 26 is a driver side rear taillight assembly. When viewed as shown in FIG. 4, the lighting assembly 26 includes an inboard side 40, an outboard side 44, an upper side 48, and a lower side 50. Further, the lighting assembly 26 generally has an upper region 52 and a lower region 54. The upper region 52 corresponds generally to the upper half of the lighting assembly 26, whereas the lower region 54 corresponds generally to the lower half of the lighting assembly 26. As shown in FIG. 5, the lighting assembly 26 additionally includes a front side 56 and a back side 58.

For purposes this disclosure, inboard and outboard refer to the general orientation of the lighting assembly 26 when installed within the vehicle 10. That is, the inboard side 40 faces inward toward a centerline of the vehicle 10, and the outboard side 44 faces outward away from the centerline of the vehicle 10. Similarly, forward and aft and upper and lower are with reference to the general orientation of the vehicle 10 during ordinary operation and with reference to ground.

Figure 6:
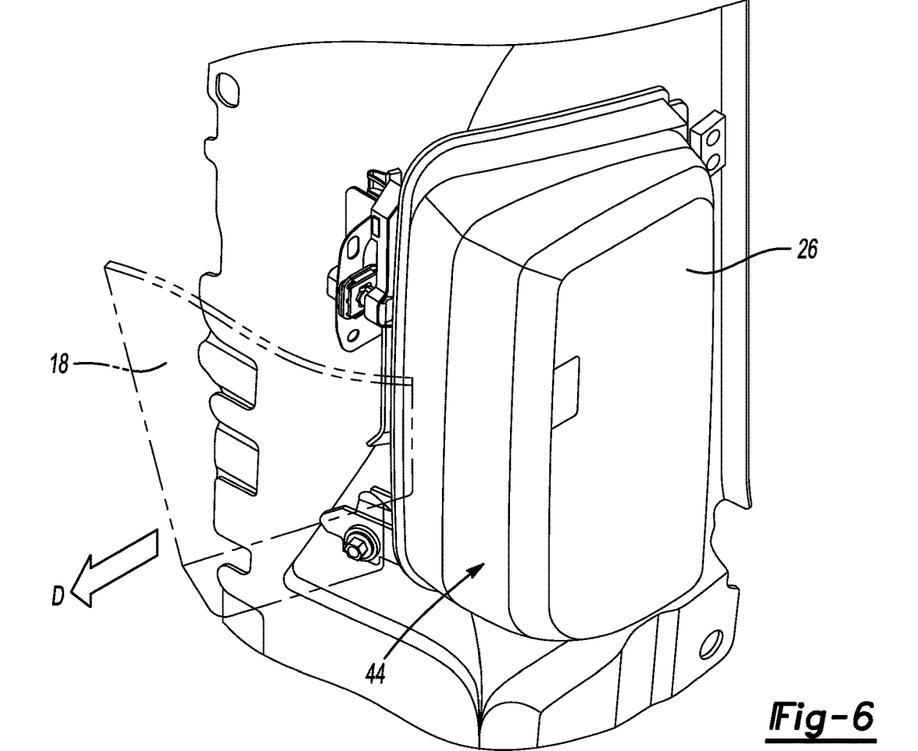
FIG. 6 illustrates a perspective and partially sectioned view of a rear corner of the vehicle of FIG. 1 showing the lighting assembly of FIGS. 4-5 in an installed position.
Figure 7:
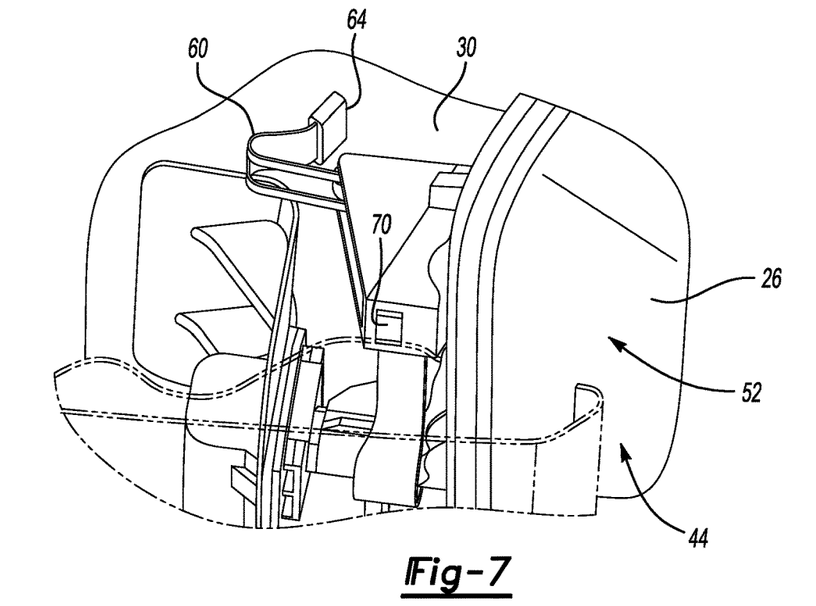
FIG. 7 illustrates a close-up view of an area of FIG. 6 showing a biasing member that biases the lighting assembly outward.
Figure 8:
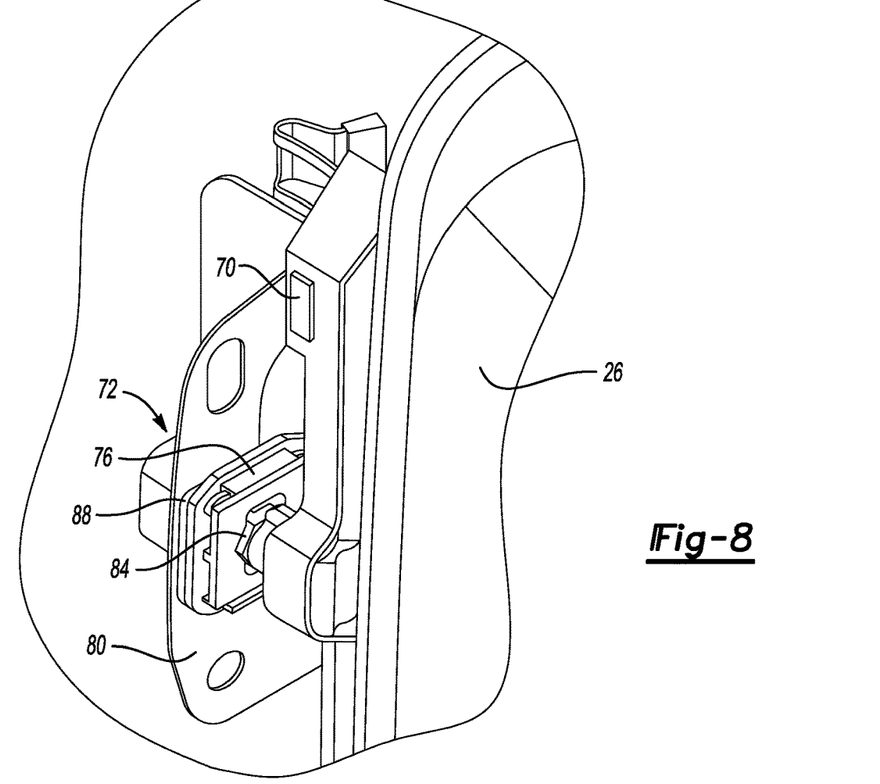
FIG. 8 illustrates a close-up view of another area of FIG. 6 showing an alignment assembly associated with the lighting assembly.

With reference now to FIGS. 6-8, the lighting assembly 26 includes a biasing member 60 extending from the back side 58. The biasing member 60 is within the upper region 52 of the lighting assembly 26. In this example, the biasing member 60 is a spring clip. FIG. 7 shows a close-up view of the exemplary biasing member 60. The biasing member 60 extends from the back side 58 to an end portion 64. A silicone pad can cover the end portion 64.

The end portion 64 of the biasing member 60 is configured to contact the body structure 30 of the vehicle 10 to bias the lighting assembly 26 outward away from the body structure 30 toward the outer panel 18 when assembling the lighting assembly 26 to the body structure 30.

In particular, during assembly of the lighting assembly 26 to the body structure 30, the lighting assembly 26 is moved into an opening 68 of the outer panel 18 such that the lighting assembly 26 is nested within the opening 68. When the lighting assembly 26 is nested within the opening 68, the lighting assembly 26 is between a portion of the outer panel 18 that is outboard the lighting assembly 26 and a portion of the body structure 30 that inboard the lighting assembly. When the lighting assembly 26 is nested within the opening 68, the outer panel 18 extends along the upper side 48 of the lighting assembly 26, and along the outboard side 44 of the lighting assembly 26. In this example, some areas of the upper side 48 of the lighting assembly 26 and some areas of the outboard side 44 are shingled beneath the edges of the outer panel 18 providing the opening 68.

As the lighting assembly 26 is moved into the opening 68, the end portion 64 of the biasing member 60 contacts the body structure 30 to bias the lighting assembly 26 outward in a direction D such that the outboard side 44 of the lighting assembly 26, and particularly the upper region 52 of the outboard side 44, is moved closer to the outer panel 18. This can help to control or reduce gaps between the outboard side 44 and the outer panel 18. In this example, the back side 58 of the lighting assembly 26 includes a net pad 70 that directly contacts a portion of the outer panel 18 when the lighting assembly 26 is biased outboard against the outer panel 18. The contact between the net pad 70 and the outer panel 18 can further facilitated controlling a gap between the lighting assembly 26 and the outer panel 18.

Although the exemplary embodiment includes the biasing member 60 extending from the lighting assembly 26, other positions for the biasing member 60 are possible and fall within the scope of this disclosure. The biasing member 60 could instead extend from the body structure 30, for example.

An alignment assembly 72 is utilized to constrain movement of the lighting assembly 26 relative to the body structure 30 and the outer panel 18 during installation of the lighting assembly 26. The alignment assembly 72 includes, in the exemplary embodiment, a floating grommet 76, a bracket 80, and an extension 84.

In the exemplary embodiment, the bracket 80 is effectively part of the body structure 30 as the bracket 80 is rigidly fixed to other portions of the body structure 30. The bracket 80 provides an aperture 88 that receives the floating grommet 76. The aperture 88 is oversized relative to the floating grommet 76. This permits the floating grommet 76 to move or "float" somewhat within the aperture 88 up and down, and inboard and outboard. The exemplary floating grommet 76 does not float forward and aft relative to the bracket 80.

As the lighting assembly 26 is moved into the opening 68, the extension 84 is received within the floating grommet 76 such that the extension 84, which extends from the lighting assembly 26 in the exemplary embodiment, is coupled to the floating grommet 76. When the extension 84 is coupled to the floating grommet 76, the alignment assembly 72 constrains forward and aft movement of the lighting assembly 26 relative to the body structure 30 more than upward and downward movement of the lighting assembly 26 relative to the body structure 30. This is due to, among other things, the ability of the floating grommet 76 to float within the aperture 88 up and down relative to the bracket 80.

The alignment assembly 72 additionally constrains forward and aft movement of the lighting assembly 26 relative to the body structure 30 more than inboard and outboard movement of the lighting assembly 26 relative to the body structure 30. This is due to the floating grommet 76 being able to float within the aperture 88 inboard and outboard without permitting substantial relative movement of the lighting assembly 26 forward and aft relative to the bracket 80.

The extension 84 can include an enlarged head and be styled as a "Gary-ball" type connector. In the exemplary embodiment, the extension 84 extends from the lighting assembly 26. In another exemplary embodiment, the alignment assembly 72 could include an extension from the body structure 30 and a bracket of the lighting assembly 26. In such an embodiment, the extension from the body structure 30 could be coupled to a floating grommet within an aperture of the bracket of the lighting assembly 26.

When the lighting assembly 26 is nested within the opening 68, the biasing member 60 biases the lighting assembly 26 outboard in the direction D. During the biasing, the alignment assembly 72 permits some movement of the lighting assembly 26 up and down relative to the body structure 30 and the outer panel 18, and some movement of the lighting assembly 26 inboard and outboard relative to the body structure 30 and the outer panel 18.

Figure 9:
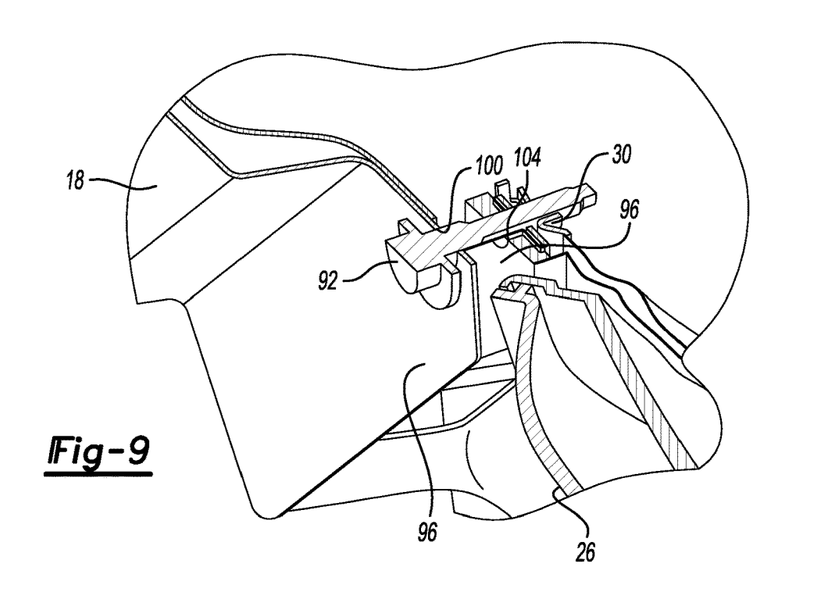
FIG. 9 illustrates a section view taken at line 9-9 in FIG. 2.

With reference now to FIG. 9 and continued reference to FIGS. 6-8, after nesting the lighting assembly 26 within the opening 68 and coupling the lighting assembly 26 with the alignment assembly 72, an outboard mechanical fastener 92 is used to secure the outboard side 44 of the lighting assembly 26 and a portion 96 of the outer panel 18 to the body structure 30. The outboard mechanical fastener 92 is a shoulder bolt in this example.

When securing the outboard side 44 of the lighting assembly 26 and the portion 96 of the outer panel 18 to the body structure 30, the outboard mechanical fastener 92 extends through an aperture 100 in the portion 96 of the outer panel 18 as well as through an aperture 104 in a bracket 106 of the lighting assembly 26.

A diameter of the aperture 100 can be greater than a diameter of the aperture 104. The aperture 100 can fit over an increased diameter area of the outboard mechanical fastener 92 when the outboard mechanical fastener 92 is securing the lighting assembly 26 and the portion 96 of the outer panel 18 to the body structure 30. The outboard mechanical fastener 92 helps to locate the lighting assembly 26, and particularly the lower regions 54 on the outboard side 44 of the lighting assembly 26, relative to the outer panel 18 in up and down directions, and in inboard and outboard directions.

After securing the outboard mechanical fastener 92, at least one inboard mechanical fastener 108 is extended through respective apertures 112 on the inboard side 40 of the lighting assembly 26 to secure the lighting assembly 26 directly to the body structure 30. Due to the biasing, the operator securing the outboard mechanical fastener 92 and the at least one inboard mechanical fastener 108 does not need to hold or pull the lighting assembly 26 outboard against the outer panel 18. After the outboard mechanical fastener 92 and the at least one inboard fastener 108 are secured, the floating grommet 76 is no longer floatable within the aperture 88 as the extension 84 position is fixed by the securing of the lighting assembly 26 to the body structure 30.

The lighting assembly can include additional apertures 116 that are used to secure a fascia of the vehicle 10 to the lighting assembly.

When the user desires to remove the outer panel 18, the user can disengage the outboard mechanical fastener 92 along with the mechanical fasteners 34 (FIGS. 2 and 3) securing the outer panel 18 to the body structure 30. The outer panel 18 can then be removed from the body structure 30. The lighting assembly 26 remains attached to the body structure 30 through the inboard mechanical fasteners 108 as well as the coupled alignment assembly 72 after the outer panel 18 is removed. The user can then reinstall a new outer panel. During the reinstallation of the new outer panel, the new outer panel can locate off of, among other things, the net pad 70. The lighting assembly 26 thus becomes a locator for the new outer panel.

Figure 10:
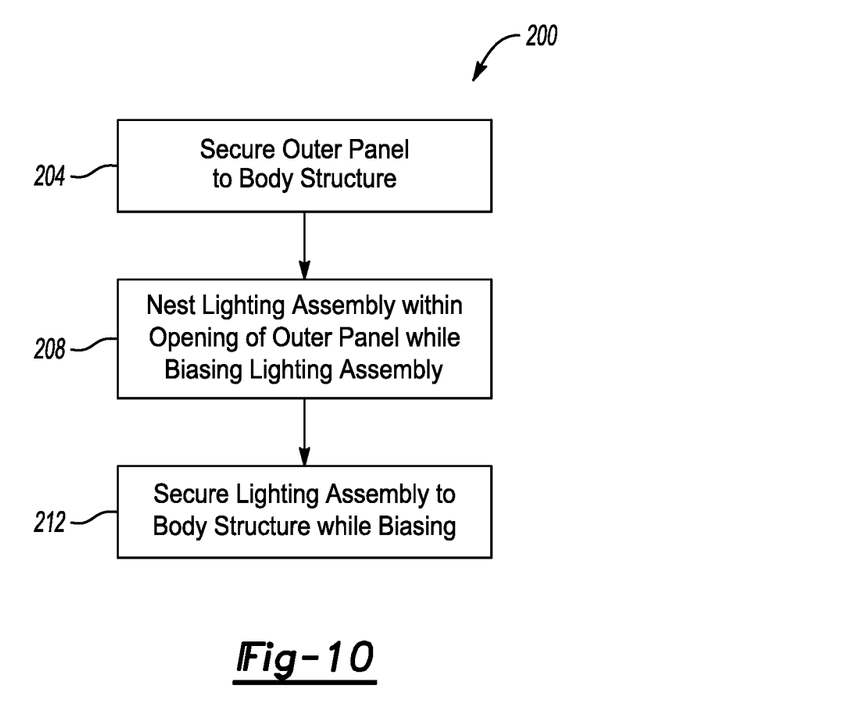
FIG. 10 shows a flow of an exemplary vehicle lighting assembly installation method.

With reference to FIG. 10, a vehicle lighting assembly installation method 200 according to an exemplary embodiment of the present disclosure begins at a step 204 where an outer panel is secured to a body structure of a vehicle. Next, at a step 208, a lighting assembly is nested within an opening of the outer panel while the lighting assembly is biased outward away from the body structure toward the outer panel. Next, at a step 212, the lighting assembly is secured to the body structure while continuing the biasing.

Biasing while securing can help to ensure that lighting assembly is moved closely toward the outer panel to, for example, reduce or control gaps between the outer panel and the lighting assembly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle lighting assembly installation method, comprising:
   coupling an outer panel of a vehicle to a body structure of the vehicle;
   biasing a lighting assembly laterally outward relative to a centerline of the vehicle away from the body structure toward the outer panel; and
   securing the lighting assembly to the body structure during the biasing,
   wherein the outer panel is a rear quarter panel and the lighting assembly is a rear taillight assembly.

2. The vehicle lighting assembly installation method of claim 1, wherein the biasing is provided by a biasing device extending from a back side of the lighting assembly.

3. The vehicle lighting assembly installation method of claim 2, wherein the securing comprises securing both an outboard side of the lighting assembly and a portion of the outer panel to the body structure using an outboard mechanical fastener.

4. The vehicle lighting assembly installation method of claim 3, wherein the outboard mechanical fastener is a shoulder bolt that extends through an aperture of the lighting assembly and an aperture of the outer panel when the outboard mechanical fastener is securing both the outboard side of the lighting assembly and the portion of the outer panel to the body structure.

5. The vehicle lighting assembly installation method of claim 3, wherein the securing further comprises securing an inboard side of the lighting assembly to the body structure using at least one inboard mechanical fastener.

6. The vehicle lighting assembly installation method of claim 5, wherein, after the securing, the outer panel can be decoupled from the body structure while the lighting assembly is secured to the body structure through the at least one inboard mechanical fastener.

7. The vehicle lighting assembly installation method of claim 2, further comprising, during the biasing and before the securing, constraining forward and aft movement the lighting assembly relative to the body structure more than inboard and outboard movement of the lighting assembly relative to the body structure.

8. The vehicle lighting assembly installation method of claim 1, further comprising, during the biasing and before the securing, constraining forward and aft movement of the lighting assembly relative to the body structure more than upward and downward movement of the lighting assembly relative to the body structure.

9. The vehicle lighting assembly installation method of claim 1, further comprising biasing using a spring clip.

10. The vehicle lighting assembly installation method of claim 1, further comprising biasing such that an outboard side of the lighting assembly is moved closer to the outer panel.

11. A vehicle lighting assembly installation method, comprising:
    coupling an outer panel of a vehicle to a body structure of the vehicle;
    biasing a lighting assembly outward away from the body structure toward the outer panel;
    securing the lighting assembly to the body structure during the biasing; and
    during the biasing and before the securing, constraining forward and aft movement of the lighting assembly relative to the body structure more than upward and downward movement of the lighting assembly relative to the body structure; and
    constraining movement of the lighting assembly relative to the body structure using a floating grommet disposed within an aperture provided by one of the lighting assembly or the body structure, the floating grommet coupled with an extension from the other of the lighting assembly or the body structure during the biasing.

12. A vehicle assembly, comprising:
    a body structure of a vehicle;
    an outer panel secured to the body structure,
    a lighting assembly secured to the body structure;
    a biasing member that biases the lighting assembly outward away from the body structure toward the outer panel when securing the lighting assembly to the body structure; and
    an alignment assembly having an extension received within floating grommet that is disposed within an aperture, the alignment assembly configured to constrain forward and aft movement of the lighting assembly relative to the body structure more than inboard and outboard movement of the lighting assembly relative to the body structure when securing the lighting assembly to the body structure.

13. The vehicle assembly of claim 12, wherein the biasing member is a spring clip.

14. The vehicle assembly of claim 13, further comprising at least one inboard mechanical fastener that secures an inboard region of the lighting assembly to the body structure.

15. The vehicle assembly of claim 14, wherein the outer panel is configured to be removed from the body structure while the lighting assembly remains secured to the body structure with the at least one inboard mechanical fastener.

16. The vehicle assembly of claim 12, further comprising an outboard mechanical fastener that extends through an aperture of the lighting assembly and an aperture of the outer panel to secure an outboard side of the lighting assembly and a portion of the outer panel to the body structure.

17. The vehicle assembly of claim 12, wherein the lighting assembly is nested within an opening of the outer panel such that the outer panel extends along an upper side of the lighting assembly and further extends along an outboard side of the lighting assembly.

18. The vehicle assembly of claim 12, wherein the outer panel is a rear quarter panel and the lighting assembly is a rear taillight assembly.

\* \* \* \* \*